United States Patent
Burr et al.

(10) Patent No.: US 11,388,913 B2
(45) Date of Patent: Jul. 19, 2022

(54) MANUFACTURE AND USE OF A STARCH-BASED SUBSTITUTE FIBER MATERIAL

(71) Applicant: PURINA ANIMAL NUTRITION LLC, Shoreview, MN (US)

(72) Inventors: Michael S. Burr, Marthasville, MO (US); Jill A. Davidson, Washington, MO (US); Catherine M. K. Bradley, Washington, MO (US); Ronald R. Scott, St. Charles, MO (US)

(73) Assignee: Purina Animal Nutrition LLC, Arden Hills, MN (US)

( * ) Notice: Subject to any disclaimer, the term of this patent is extended or adjusted under 35 U.S.C. 154(b) by 858 days.

(21) Appl. No.: 14/997,265

(22) Filed: Jan. 15, 2016

(65) Prior Publication Data

US 2017/0202243 A1 Jul. 20, 2017

(51) Int. Cl.
| | |
|---|---|
| *A23K 50/10* | (2016.01) |
| *A23K 10/30* | (2016.01) |
| *A23K 20/163* | (2016.01) |
| *A23K 20/105* | (2016.01) |
| *A23K 20/10* | (2016.01) |

(52) U.S. Cl.
CPC .............. *A23K 50/10* (2016.05); *A23K 10/30* (2016.05); *A23K 20/10* (2016.05); *A23K 20/105* (2016.05); *A23K 20/163* (2016.05)

(58) Field of Classification Search
CPC ..... A23K 50/10; A23K 20/163; A23K 20/105
See application file for complete search history.

(56) References Cited

U.S. PATENT DOCUMENTS

| | | | |
|---|---|---|---|
| 3,976,766 A | 8/1976 | Salvesen et al. | |
| 4,376,129 A | 3/1983 | Piukovich et al. | |
| 2008/0260896 A1* | 10/2008 | Cecava | C10L 1/026 |
| | | | 426/2 |
| 2012/0128816 A1* | 5/2012 | Ametaj | A23K 10/30 |
| | | | 426/2 |

FOREIGN PATENT DOCUMENTS

| | | |
|---|---|---|
| KR | 20020067370 A | 8/2002 |
| WO | 2009/079707 A1 | 7/2009 |

(Continued)

OTHER PUBLICATIONS

"Effect of Particle size on the taste, texture and manufacture of chocolate products, particle size analysis using teh micromeritics Digisizer". Available online atwww.azom.com on Mar. 13, 2007. (Year: 2007).*

(Continued)

*Primary Examiner* — Erik Kashnikow
*Assistant Examiner* — Assaf Zilbering
(74) *Attorney, Agent, or Firm* — Dorsey & Whitney LLP

(57) ABSTRACT

Substitute fiber materials include at least one starch, at least one acid, and at least one plasticizer. The starch may be ground whole grain, the acid may be citric acid, and the plasticizer may be glycerin. The substitute materials are biodegradable and compostable. Methods involve feeding animals the substitute fiber materials as a substitute for or a supplement to natural fiber. The substitute fiber materials are at least partially digested in the animal.

18 Claims, 2 Drawing Sheets

(56) References Cited

FOREIGN PATENT DOCUMENTS

WO     WO-2009079707 A1 *   7/2009   ............. A23K 50/10
WO        2011/006252 A1      1/2011

OTHER PUBLICATIONS

European Search Report for European Application No. 17150509.2, dated May 31, 2017, 9 pages.
Stallings, Charles C., "Guidelines for Developing Dairy Rations", West Virginia University, 3 pages, Aug. 1999, downloaded from http://www.wvu.edu/~agexten/forglvst/dairyrat.htm.

* cited by examiner

MANUFACTURE AND USE OF A STARCH-BASED SUBSTITUTE FIBER MATERIAL

TECHNICAL FIELD

The present disclosure relates to substitute fiber material, such as starch-based fiber material, and methods of feeding such substitute fiber material to animals.

BACKGROUND

High-fiber sources such as forages, which include grasses, hay, and silage, are commonly ingested by livestock animals. When growing conditions result in a shortage of forages, other fiber sources can include cottonseed hulls, whole cottonseeds, and soy hulls. However, these feeds are typically limited to 10% to 15% of the dry matter intake by the animal. For high-fiber sources, high-energy feed sources may be used to supplement the diet and may include corn, hominy, barley, milo, soybeans, or other grains.

SUMMARY

Provided herein are substitute fiber materials (SFM) and methods of feeding SFM that may be used as a fiber replacement or fiber substitute. The SFM of the present disclosure may be partially or completely digested in the digestive tract of an animal and/or partially or completely composted post-excretion.

The SFM comprises at least one starch, at least one cross-linker, and at least one plasticizer. In some implementations, a method of feeding a ruminant the SFM is provided, and the SFM is at least partially digested by the ruminant. In some embodiments, the starch is present in an amount of about 25 wt % to about 70 wt % by dry weight of the SFM. In some embodiments, the starch is a whole grain. In some embodiments, the whole grain comprises one or more of corn, wheat, oat, or barley. In some embodiments, the whole grain has a particle size such that about 20% to 55% of the particles pass through a 200 mesh screen. In some embodiments, the whole grain has a particle size such that about 3% to 10% of the particles pass through a 400 mesh screen. In some embodiments, the cross-linker is an edible acid and comprises one or more of acetic acid, citric acid, fumaric acid, lactic acid, malic acid, phosphoric acid or tartaric acid. In some embodiments, the plasticizer comprises one or more of arabitol, erythritol, glycerin, isomalt, lactitol, maltitol, mannitol, sorbitol or xylitol. In some embodiments, the SFM is biodegradable. In some embodiments, the SFM is at least partially degraded in each of the rumen, the abomasum, and the small intestines. In some embodiments, the SFM is at least partially degraded in the rumen. In some embodiments, the SFM has a total tract digestibility of about 100 percent. In some embodiments, the SFM comprises strips of about 0.2 cm to 20 cm in length.

Also disclosed herein is a SFM comprising at least one starch, at least one cross-linker, and at least one plasticizer, the starch is a whole grain ground such that about 20% to 55% of the particles pass through a 200 mesh screen and about 3% to 10% of the particles pass through a 400 mesh screen, the SFM is digestible by a ruminant, and the SFM compostable. In some embodiments, the whole grain is corn, wheat, oat, or barley. In some embodiments, the cross-linker is an edible acid and comprises one or more of acetic acid, citric acid, fumaric acid, lactic acid, malic acid, phosphoric acid or tartaric acid. In some embodiments, the plasticizer comprises one or more of arabitol, erythritol, glycerin, isomalt, lactitol, maltitol, mannitol, sorbitol or xylitol.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. A more extensive presentation of features, details, utilities, and advantages of the present invention as defined in the claims is provided in the following written description of various embodiments of the invention and illustrated in the accompanying drawings.

DETAILED DESCRIPTION

Overview

Figure 1:
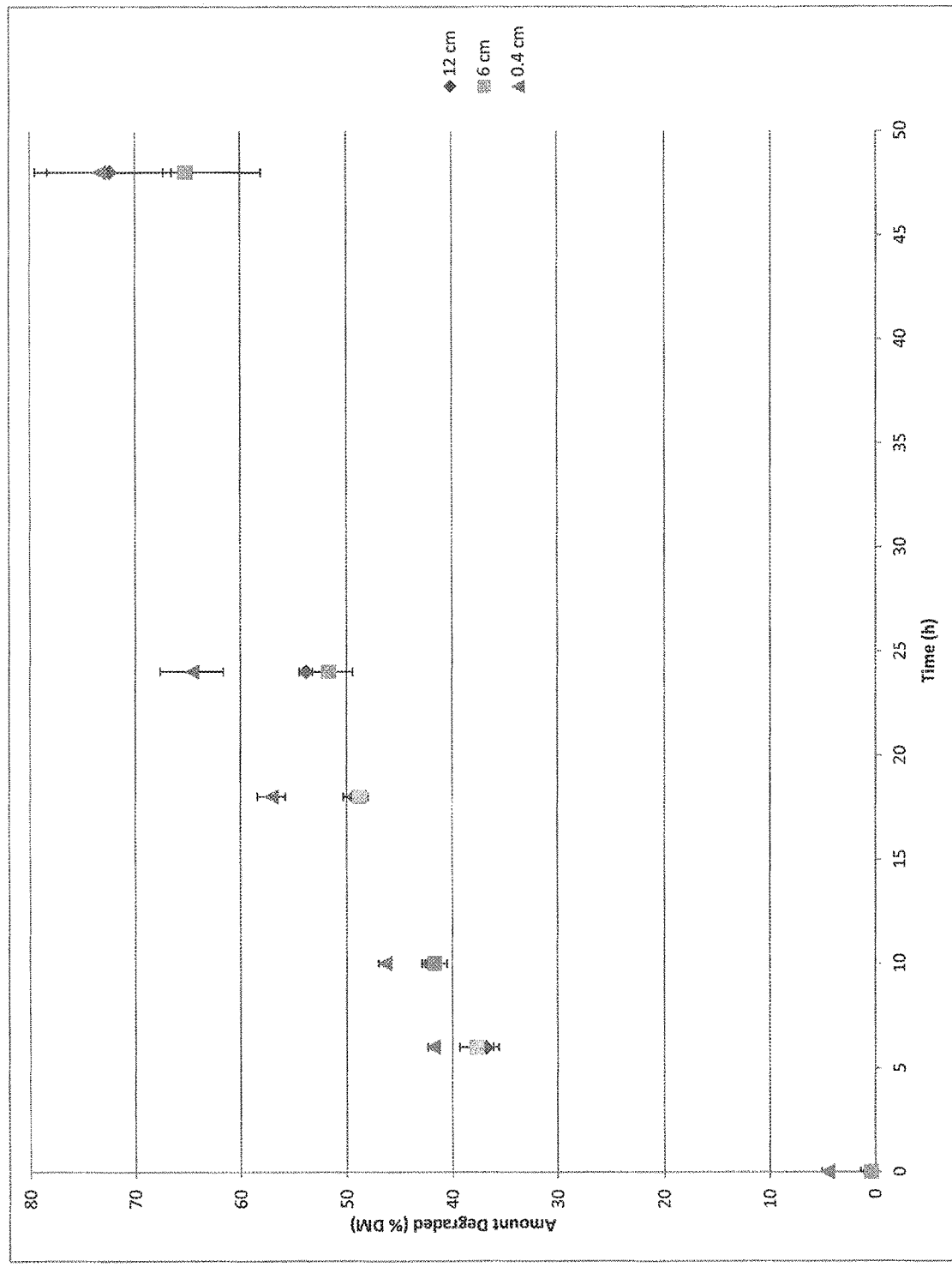
FIG. 1 is a graph illustrating the amount of SFM degraded after in sacco digestion for up to 48 hours with error bars indicating the standard deviation.

Provided herein are substitute fiber materials (SFM) and methods of feeding SFM to animals. The SFM may be fed as a complete food source, a substitute fiber source, or a supplement to natural forage sources. In some embodiments, the SFM may be for feeding ruminants, and in particular, may become part of the rumen mat material for the ruminants.

Ruminants are even-toed, hoofed animals which have a complex three- or four-chamber stomach and which typically rechew what they have previously swallowed. The four sections of the ruminant stomach include: a rumen, a reticulum, an omasum, and an abomasum. Each section of the stomach serves a different function in the digestive process. In the rumen, food is mixed with saliva and then churned in a coordinated motion. The food mixture undergoes some fermentation and bacterial digestion in the rumen. The mixture of food and saliva then passes to the reticulum where the mixture is formed into a cud that can be regurgitated. After thorough chewing of the regurgitated cud, the cud is reswallowed and then passes from the rumen through the reticulum and into the omasum, if particle size restrictions are satisfied. While in the omasum, the mixture is additionally mixed to maintain it in a homogenous state and to remove excess fluid. Then the homogenous mixture is passed from the omasum to the abomasum, where gastric digestion occurs.

Domesticated ruminants usually graze on or are fed natural forages such as alfalfa silage or grass hay as a portion of the feed component, along with other high energy feed components such as grain or concentrates. Forages are generally considered essential in order to maintain animal health because they provide nutrition and also help form a mat in the rumen.

The rumen mat, which is comprised of undigested forage fiber, acts as a filtering agent for ruminal contents. Below the mat, flowing fluid of undigested nutrients moves out of the rumen. A normal mat may selectively retain contents in the rumen to facilitate digestibility and feed efficiency. A relatively small mat causes fluid to move through the rumen at a fast rate, which results in a lower feed efficiency (e.g., higher intake) and lower rumen digestibility. A relatively larger mat causes fluid to move through the rumen at a slow rate, which results in higher rumen digestibility of starch, fiber, and other dietary nutrients. The larger mat may also cause the ruminant to reduce feeding due to the fiber exerting much pressure against the ruminal wall. The rumen mat has also been shown to produce a scraping or scratching action that helps maintain healthy rumen wall tissues, stimulates saliva production and slows passage rates.

When forage is unavailable or expensive, an artificial fiber can substitute or supplement natural forages. Artificial forages are often non-digestible petroleum-based plastics. Non-digestible artificial forages provide no nutritional value to ruminants. Non-digestible artificial forages that are not biodegradable not only pass through the animals, but also do not degrade in fecal matter, which results in pollution and disposal problems. Some portions of non-digestible artificial forages do not pass through the animals because they become lodged in animals' tissues, such as the cheek meet.

Applicant has discovered that a substitute or manufactured substitute fiber material (SFM) may provide benefits over natural fiber sources such as natural forages and over non-digestible artificial forages. The SFM may include at least one starch, at least one cross-linker, and at least one plasticizer. The combination of components plus water may yield an edible, digestible, biodegradable and cross-linked bioplastic. Unlike prior approaches in which the substitute SFM is non-digestible, the SFM of the present disclosure may be partially or completely digested in the digestive tract of an animal. For instance, the presently disclosed SFM are partially or completely digestible in the rumen of a ruminant. It was surprisingly found that the degradability of SFM approximates that of alfalfa stems. (Example 3; see also Example 5.) SFM comprises at least one starch and would be expected to degrade like a starch, but it surprisingly degrades like a fiber (alfalfa stems). SFM would be expected to degrade rapidly because it comprises a rapidly degradable starch, but it surprisingly degrades more slowly. Approximating the ruminal degradability of alfalfa indicates that the SFM may be used as a substitute for alfalfa or other fibers in the diet.

In embodiments, the SFM may be partially or completely digestible in the abomasum or the small intestines or both the abomasum and the small intestines of a ruminant. (Example 4.) SFM may be completely digested in the digestive tract of a ruminant. (Example 4.)

Also, unlike prior approaches in which the substitute forage is not biodegradable, the SFM of the present disclosure may be partially or completely composted. For instance, the presently disclosed SFM may be biodegradable or compostable. In embodiments, any portion of a SFM that is not digested in an animal and is instead passed into manure is degradable at least by composting. SFM may be compostable to a greater extent than alfalfa stems, at a faster rate than alfalfa stems, or both to a greater extent than and at a faster rate than alfalfa stems. (Example 7.)

Fiber Material Compositions

Fiber materials of the present disclosure may include at least one source of starch, at least one cross-linker, and at least one plasticizer. The SFM may also include water, at least one fat, fiber, grains, protein, vitamins, minerals and other components.

In embodiments, the at least one starch is a digestible starch or starch component. As used herein, a digestible starch or starch component refers to those carbohydrate fractions that are digested, degraded, solubilized or otherwise broken down to another form. In embodiments, the digestible starch may be characterized as a ruminally digestible starch, which may be digested, degraded, solubilized or otherwise broken down to another form in the rumen. Such starch or starch components includes both starch and sugars.

Sources for the starch include, but are not limited to, corn grain, corn flour, corn silage, corn starch, corn byproducts, sorghum grain, sorghum silage, sorghum byproducts, milo, wheat grain, wheat flour, wheat silage, wheat bran, red dog wheat, wheat flour, wheat middlings, wheat byproducts, barley grain, barley flour, barley silage, barley byproducts, oat grain, oat flour, oat silage, oat byproducts, bakery byproducts, hominy feed, peas, malt sprouts, rice, rice flour, rice byproducts, cereal feed, sucrose, lactose, glucose, dextrose, maltose, and tubers such as potatoes, yams, sweet potatoes, cassava, and arrow root.

In embodiments, the starch is from a whole grain, such as whole corn, whole wheat, whole oat, or whole barley. The whole grain may be ground to produce finely ground particles. In embodiments, about 20% to 55% of the particles pass through a 200 mesh screen (e.g., an opening of about 0.074 mm), or about 22% to 55%, or about 25% to 55%, or about 30% to 55%, or about 35% to 55%, or about 40% to 55%, or about 20% to 50%, or about 20% to 45%, or about 20% to 40%, or about 20% to 35%, or about 20% to 30%, or about 22% to 50%, or about 25% to 45%, or about 30% to 40% of the particles pass through a 200 mesh screen.

In embodiments, about 3% to 10% of the particles pass through a 400 mesh screen (e.g., an opening of about 0.037 mm), or about 4% to 10%, or about 5% to 10%, or about 6% to 10%, or about 3% to 9%, or about 3% to 8%, or about 3% to 7%, or about 4% to 9%, or about 5% to 8%, or about 6% of the particles pass through a 400 mesh screen.

In embodiments, grinding whole grain exposes more starch for cross-linking, such as cross-linking by an acid. In addition, the size of the whole ground grain may affect the rate and the extent of digestion of the SFM described herein.

In embodiments, the starch is present in the SFM at about 2 wt % to 25 wt % based on the total weight of the SFM before drying (see Examples 1 and 2), or about 4 wt % to 25 wt %, or about 6 wt % to 25 wt %, or about 8 wt % to 25 wt %, or about 10 wt % to 25 wt %, or about 12 wt % to 25 wt %, or about 14 wt % to 25 wt %, or about 2 wt % to 20 wt %, or about 2 wt % to 18 wt %, or about 2 wt % to 16 wt %, or about 2 wt % to 14 wt %, or about 2 wt % to 12 wt %, or about 4 wt % to 20 wt %, or about 6 wt % to 18 wt %, or about 8 wt % to 16 wt %, based on the total weight of the SFM before drying.

In embodiments, the starch is present in the dry SFM at about 25 wt % to 70 wt % based on the total weight of the dry SFM, or about 30 wt % to 70 wt %, or about 35 wt % to 70 wt %, or about 40 wt % to 70 wt %, or about 45 wt % to 70 wt %, or about 50 wt % to 70 wt %, or about 25 wt % to 65 wt %, or about 25 wt % to 60 wt %, or about 25 wt % to 55 wt %, or about 25 wt % to 50 wt %, or about 25 wt % to 45 wt %, or about 30 wt % to 65 wt %, or about 35 wt % to 60 wt %, or about 40 wt % to 55 wt %, based on the total weight of the dry SFM.

In embodiments, the at least one cross-linker is an acid. In embodiments, the acid is an edible acid. Edible acids include, but are not limited to, acetic acid, citric acid, fumaric acid, lactic acid, malic acid, phosphoric acid, and tartaric acid. Acetic acid may be in the form of vinegar. The vinegar may be about 4-18% acetic acid by mass. For example, the vinegar may be about 8% acetic acid by mass. Embodiments of the SFM comprising citric acid improve palatability of the SFM. The acid may be in liquid or dry, such as powdered, form. For example, citric acid may be in liquid or dry form. Without being limited to any mechanism or mode of action, the acid may cross-link the starch.

In embodiments, the cross-linker is present in the SFM at about 0.2 wt % to 16 wt % based on the total weight of the SFM before drying (see Examples 1 and 2), or about 0.4 wt % to 16 wt %, or about 0.6 wt % to 16 wt %, or about 0.8 wt % to 16 wt %, or about 1 wt % to 16 wt %, or about 2 wt % to 16 wt %, or about 4 wt % to 16 wt %, or about 0.2 wt % to 14 wt %, or about 0.2 wt % to 12 wt %, or about 0.2 wt % to 10 wt %, or about 0.2 wt % to 8 wt %, or about 0.4 wt % to 14 wt %, or about 0.8 wt % to 12 wt %, or about 1 wt % to 10 wt %, or about 2 wt % to 8 wt % based on the total weight of the SFM before drying.

In embodiments, the cross-linker is present in the dry SFM at about 0.2 wt % to 10 wt % based on the total weight of the dry SFM, or about 0.4 wt % to 10 wt %, or about 0.6 wt % to 10 wt %, or about 0.8 wt % to 10 wt %, or about 1 wt % to 10 wt %, or about 2 wt % to 10 wt %, or about 4 wt % to 10 wt %, or about 0.2 wt % to 9 wt %, or about 0.2 wt % to 8 wt %, or about 0.2 wt % to 7 wt %, or about 0.2 wt % to 6 wt %, or about 0.2 wt % to 5 wt %, or about 0.4 wt % to 8 wt %, or about 0.8 wt % to 6 wt %, or about 1 wt % to 5 wt %, or about 2 wt % to 4 wt % based on the total weight of the dry SFM.

In embodiments, the at least one plasticizer is a generally recognized as safe (GRAS) bio-based plasticizer. In embodiments, the plasticizer is a crude or refined sugar alcohol including, but not limited to, arabitol, erythritol, glycerin (glycerol), isomalt, lactitol, maltitol, mannitol, sorbitol, or xylitol. In embodiments, the plasticizer, such as glycerin, is metabolized as a carbohydrate and provides an energy source.

In embodiments, the plasticizer is present in the SFM at about 1 wt % to 24 wt % based on the total weight of the SFM before drying (see Examples 1 and 2), or about 2 wt % to 24 wt %, or about 3 wt % to 24 wt %, or about 4 wt % to 24 wt %, or about 6 wt % to 24 wt %, or about 8 wt % to 24 wt %, or about 10 wt % to 24 wt %, or about 1 wt % to 20 wt %, or about 1 wt % to 18 wt %, or about 1 wt % to 16 wt %, or about 1 wt % to 14 wt %, or about 1 wt % to 12 wt %, or about 2 wt % to 20 wt %, or about 3 wt % to 18 wt %, or about 4 wt % to 16 wt %, or about 6 wt % to 14 wt % based on the total weight of the SFM before drying. Lower amounts of plasticizer may yield a stiffer or more rigid SFM and higher amounts of plasticizer may yield a more flexible SFM.

In embodiments, the plasticizer is present in the dry SFM at about 5 wt % to 40 wt % based on the total weight of the dry SFM, or about 7 wt % to 40 wt %, or about 9 wt % to 40 wt %, or about 11 wt % to 40 wt %, or about 13 wt % to 40 wt %, or about 15 wt % to 40 wt %, or about 20 wt % to 40 wt %, or about 25 wt % to 40 wt %, or about 5 wt % to 38 wt %, or about 5 wt % to 36 wt %, or about 5 wt % to 34 wt %, or about 5 wt % to 32 wt %, or about 5 wt % to 30 wt %, or about 5 wt % to 25 wt %, or about 5 wt % to 20 wt %, or about 10 wt % to 35 wt %, or about 15 wt % to 30 wt %, or about 20 wt % to 25 wt % based on the total weight of the dry SFM.

In embodiments, the SFM includes water. In embodiments, the water is present in the SFM at about 45 wt % to 95 wt % based on the total weight of the SFM before drying (see Examples 1 and 2), or about 50 wt % to 95 wt %, or about 55 wt % to 95 wt %, or about 60 wt % to 95 wt %, or about 65 wt % to 95 wt %, or about 70 wt % to 95 wt %, or about 45 wt % to 90 wt %, or about 45 wt % to 85 wt %, or about 45 wt % to 80 wt %, or about 45 wt % to 75 wt %, or about 45 wt % to 70 wt %, or about 50 wt % to 90 wt %, or about 55 wt % to 85 wt %, or about 60 wt % to 80 wt %, or about 65 wt % to 75 wt % based on the total weight of the SFM before drying.

In embodiments, the SFM includes water. In embodiments, the water or moisture is present in the dry SFM at about 1 wt % to 35 wt % based on the total weight of the dry SFM, or about 2 wt % to 35 wt %, or about 3 wt % to 35 wt %, or about 4 wt % to 35 wt %, or about 5 wt % to 35 wt %, or about 10 wt % to 35 wt %, or about 15 wt % to 35 wt %, or about 20 wt % to 35 wt %, or about 1 wt % to 32 wt %, or about 1 wt % to 30 wt %, or about 1 wt % to 28 wt %, or about 1 wt % to 26 wt %, or about 1 wt % to 20 wt %, or about 1 wt % to 15 wt %, or about 5 wt % to 30 wt %, or about 5 wt % to 25 wt %, or about 10 wt % to 20 wt %, based on the total weight of the dry SFM.

The SFM optionally includes at least one fat. The fat may provide nutrients and may help release the SFM from the surface on which it was placed to dry. Fat may include but is not limited to: corn oil, canola seeds or oil, cottonseed seeds or oil, linseed seeds or oil, safflower seeds or oil, soybean seeds or oil, sunflower seeds or oil, fishmeal, white or yellow grease, lard, tallow and combinations.

In embodiments, the fat is present in the dry SFM at about 0.2 wt % to 15 wt % based on the total weight of the dry SFM, or about 0.4 wt % to 15 wt %, or about 0.6 wt % to 15 wt %, or about 0.8 wt % to 15 wt %, or about 1 wt % to 15 wt %, or about 2 wt % to 15 wt %, or about 4 wt % to 15 wt %, or about 6 wt % to 15 wt %, or about 8 wt % to 15 wt %, or about 0.2 wt % to 13 wt %, or about 0.2 wt % to 11 wt %, or about 0.2 wt % to 9 wt %, or about 0.2 wt % to 7 wt %, or about 0.2 wt % to 5 wt %, or about 0.4 wt % to 10 wt %, or about 0.8 wt % to 8 wt %, or about 1 wt % to 5 wt %, or about 1 wt % to 3 wt % based on the total weight of the dry SFM.

In embodiments, the SFM includes one or more of a strengthener, a humectant, and a palatant.

The strengthener may be any GRAS additive capable of strengthening a bioplastic. The strengthener may be polysaccharide or protein-based. The polysaccharide may be a starch, vegetable gum, or pectin. Examples of starch strengtheners include, but are not limited to, arrowroot, cornstarch, fecula, katakuri starch, potato starch, sago, tapioca, or derivatives of any of the foregoing. Examples of vegetable gum strengtheners include, but are not limited to, alginin, guar gum, locust bean gum, or xanthan gum. Examples of protein strengtheners include, but are not limited to, collagen, egg whites, furcellaran, and gelatin.

The humectant may be may be any GRAS additive capable of maintaining water in a SFM or reducing or preventing water loss from a SFM. Examples of humectants include, but are not limited to, formula feeds, feed pellets, feed nuggets, honey, glucose syrup, non-ionic polyols such as sucrose, glycerin, and triacetin, and sodium hexametaphosphate.

The palatant may be any GRAS additive that improves acceptance and/or reduces exclusionary sorting of a SFM. Examples of palatant include, but are not limited to, molasses, such as cane molasses or beet molasses, flavorings, and any of the sugar alcohols disclosed herein.

In embodiments, the SFM includes one or more of fiber, grain, protein, vitamins, and minerals. Including one or more of fiber, grain, protein, vitamins, minerals and other components that may help the SFM provide some or all nutrients required by an animal. For instance, the SFM may serve as a feed supplement or as a complete feed.

The fiber may include but is not limited to natural fibers include hulls, such as hulls of soy, grains, seeds, almonds, and peanuts, beet pulp, brewers grains, citrus pulp, corn gluten feed, dried distillers grains, oats, wheat bran, wheat germ, wheat midds, and forages. Examples of natural forage sources include, but are not limited to, alfalfa silage, corn silage, wheat silage, sorghum silage, oat silage, grass silage, ryegrass silage, barley silage, triticale silage, grass hay, alfalfa hay, oat hay, wheat hay, barley hay, ryegrass hay, triticale hay, oat straw, wheat straw, barley straw, whole cottonseed, cottonseed hulls, beet pulp or any combination thereof. In implementations, animals may be fed the SFM instead of or in addition to natural sources of fiber. The grain may include but is not limited to: corn, barley, wheat, or oats. The protein may include but is not limited to: fescue hay, haylage, shelled corn, raw or roasted soybeans, soybean meal, urea, corn distillers grains, brewers grains, or corn gluten meal. The vitamins may include but are not limited to: A, B, D, E, or K. The minerals may include but are not limited to: calcium, chlorine, cobalt, copper, iodine, iron, magnesium, manganese, phosphorus, potassium, selenium, sodium, sulfur, or zinc. Other components that may be incorporated in the SFM include sodium bicarbonate and may provide the animal with a source of alkalinity.

Methods of Producing Fiber Material Compositions

In embodiments, the presently disclosed SFM may be prepared according to Examples 1 or 2. Before drying, the SFM may be poured into any shape, such as a thin, flat sheet. The sheet may be any thickness, such as about 0.05 inch to 1.25 inches, about 0.06 inch to 1 inch, or about 0.25 inch to 0.5 inch. The SFM may be extruded, such as by a syringe, into flat strips or round, spaghetti-like strips, or any other shape. Once dry, the SFM may be cut, such as with a paper cutter, scissors, or knife, into any desired particle shape and size.

In embodiments, preparation of SFM includes addition of a component that reduces the density of the SFM. The component may reduce the density by releasing gas bubbles that disperse through the material. The component may be one capable of breaking down in an acidic environment to produce a gas. The component may be sodium bicarbonate or calcium carbonate, which may release carbon dioxide. In embodiments, reducing the density of the SFM may beneficially help the SFM float in the rumen of a ruminant and thereby mimic natural forage.

In embodiments, the density-reducing component is added when the material reaches a paste-like consistency. (See Example 1.) The thick consistency of the material may trap gas bubbles and yield a less dense product.

In embodiments, the SFM is cut into strips after drying. In embodiments, the SFM is tumbled in a dryer to break the SFM strips into shorter lengths. The strips may be substantially rectangular or may be round like spaghetti. The strips may be substantially the same length or may be different lengths. In embodiments, the strips are about 0.2 cm to 20 cm in length, or about 0.5 cm to 20 cm, or about 1 cm to 20 cm, or about 2 cm to 20 cm, or about 4 cm to 20 cm, or about 6 cm to 20 cm, or about 8 cm to 20 cm, or about 10 cm to 20 cm, or about 0.2 cm to 18 cm, or about 0.2 cm to 16 cm, or about 0.2 cm to 14 cm, or about 0.2 cm to 12 cm, or about 0.2 cm to 10 cm, or about 0.2 cm to 8 cm, or about 0.5 cm to 18 cm, or about 1 cm to 16 cm, or about 2 cm to 14 cm, or about 4 cm to 12 cm, or about 6 cm to 10 cm, or about 2 cm to 4 cm in length.

In embodiments, the dried strips are about 0.2 mm to 20 mm in diameter, or about 0.5 mm to 20 mm, or about 1 mm to 20 mm, or about 2 mm to 20 mm, or about 4 mm to 20 mm, or about 6 mm to 20 mm, or about 8 mm to 20 mm, or about 10 mm to 20 mm, or about 0.2 mm to 18 mm, or about 0.2 mm to 16 mm, or about 0.2 mm to 14 mm, or about 0.2 mm to 12 mm, or about 0.2 mm to 10 mm, or about 0.2 mm to 8 mm, or about 0.5 mm to 18 mm, or about 1 mm to 16 mm, or about 2 mm to 14 mm, or about 2 mm to 12 mm, or about 4 mm to 8 mm in diameter.

Methods of Feeding Substitute Fiber Material

The SFM may be provided to an animal as a substitute for the entire amount of natural fiber in a ration. The SFM may be provided to an animal as a substitute for a portion of the natural fiber in a ration and may thereby be provided along with natural fiber. When the animal is a ruminant, the SFM may be provided as a substitute for the entire amount or a portion of the natural forage in a ration.

In addition or alternatively, the SFM fed to animals includes components such as fiber, grain, protein, vitamins, or minerals, and is provided as a feed supplement or a complete feed. Accordingly, the SFM may be provided as part of any animal diet. For example, the SFM may be provided with concentrates, forages, and/or other feed components. The SFM may also be provided with natural fiber. In more particular implementations, the SFM is provided as part of any ruminant diet. For example, the SFM may be provided with concentrates, forages, and/or other feed components. The SFM may be provided as part of a total mixed ration. The SFM may also be provided with natural forage or other natural roughages. In implementations, the SFM is provided to lactating ruminants, such as dairy cows. In implementations, the SFM is provided to beef cows.

The SFM may be provided at about 1% to 100% by weight of a total daily ration, or about 2% to 100%, or about 5% to 100%, or about 10% to 100%, or about 15% to 100%, or about 20% to 100%, or about 25% to 100%, or about 30% to 70%, or about 35% to 100%, or about 40% to 100%, or about t 45% to 100%, or about 50% to 100%, or about 55% to 100%, or about 60% to 100%, or about 65% to 100%, or about 70% to 100%, or about 75% to 100%, or about 80% to 100%, or about 85% to 100%, or about 90% to 100%, or about 1% to 65%, or about 1% to 95%, or about 1% to 90%, or about 1% to 85%, or about 1% to 80%, or about 1% to 75%, or about 1% to 70%, or about 1% to 65%, or about 1% to 60%, or about 1% to 55%, or about 1% to 50%, or about 1% to 45%, or about 1% to 40%, or about 1% to 35%, or about 1% to 30%, or about 1% to 25%, or about 1% to 20%, or about 1% to 15%, or about 1% to 10%, or about 2% to 65%, or about 5% to 60%, or about 10% to 55%, or about 15% to 50%, or about 20% to 55%, or about 25% to 50%, or about 30% to 45%, or about 1% to 6%, or about 7% to 16%, or about 7% to 11%, or about 55% to 61% by weight of a total daily ration.

The SFM may be provided to an animal alone or the SFM may be mixed into a feed ration. The SFM may be provided to an animal at each feeding in a day, or at some, but not all, feedings in a day. When the SFM is provided at more than one feeding in a day, it may be provided in the same amount or different amounts at each feeding.

The SFM may be cut to one or more desired shapes and sizes before being fed to an animal. In addition or alternatively, the SFM may be provided in preselected sizes. In embodiments, the shape and size of the SFM encourages positive selection or does not encourage negative selection by an animal when the animal sorts feed. SFM ingested by the ruminant may be digested in the rumen, the abomasum and/or small intestines. In the rumen, the SFM may be partially digestible. For instance, the SFM may be at least 40, 45, 50, 55, 60, 65, 70, 75, 80 or 85 percent digestible in the rumen. Digestibility in the rumen may depend, for instance, on the particle size of the starch material in the SFM and the rate and extent of digestion of the rumen contents; and approximately 40 percent of the SFM may be digested in the rumen within 6 hours; approximately 45 percent of the SFM may digested within 10 hours; approximately 60 percent may be digested within 18 hours; approximately 65 percent may be digested within 24 hours; and at least 70 percent may be digested within 48 hours. In some implementations, the SFM may be at least 0.4 cm pieces. In further implementations, the SFM may be at least 6 cm pieces, and this size of SFM may digest slightly slower compared to the aforementioned digestion levels. However, in some cases, ruminal digestion of the SFM may be at a level of about 75 to about 85 percent of the total amount of the SFM after about 24 hours of ruminal fermentation. When passing to the abomasum, the SFM may be further digested and about 95 to 99 percent of the total amount of the SFM. Passage to the small intestines may result in the remainder of the SFM digesting in the ruminant. Accordingly, in some implementations, the SFM may be completely digested in the digestive tract of the ruminant; and for instance, the total tract digestibility of the SFM may be 100 percent.

The SFM ingested by the animal mimics the physical characteristics of natural fibers and may be a substitute for or a supplement to natural sources of fiber. For instance, the SFM may be included in the animal diet when natural fibers are scarce or not available, such as in times of drought. The SFM may additionally or alternatively be incorporated in to the animal diet in order to reduce or eliminate expensive natural fiber. In addition or alternatively, the SFM may be provided as a supplement to or substitute for natural forage. For instance, the SFM may be included in the ruminant diet when natural forages are scarce or not available, such as in times of drought. The SFM may additionally or alternatively be incorporated in to the ruminant diet in order to reduce or eliminate expensive natural forage and supplementing.

In implementations, the SFM ingested by the animal mimics the digestibility of natural fibers. In implementations, the SFM is partially or completely digested by the animal. In implementations, the SFM is partially or completely digested in the digestive tract of an animal. In implementations, the rate of digestion of the SFM is similar to the rate of digestion of natural fibers. In implementations, animals gain nutritional value from the SFM when it is digested. In implementations, the SFM is partially or completely biodegradable or compostable.

In implementations, the SFM mimics the digestibility of natural forages. In implementations, the SFM fed to the animal is partially or completely digested by the ruminant. In implementations, the SFM is partially or completely digested in the digestive tract of a ruminant. In implementations, ruminants gain nutritional value from the SFM when it is digested.

In implementations, the SFM mimics the rumen digestibility of natural forages. In implementations, the SFM is partially or completely digested in the rumen of a ruminant. In implementations, the SFM is digested partially in the rumen and digested completely in the lower digestive tract.

In implementations, animals ingesting the SFM may produce less manure than animals ingesting non-digestible artificial forages. The reduced amount of manure may be a result of the partial or complete digestibility of the SFM in the digestive tract of the ruminant.

In implementations, animals ingesting the SFM may produce less manure than animals ingesting natural forage or fiber sources. The reduced amount of manure may be a result of the partial or complete digestibility of the SFM in the digestive tract of the ruminant.

In implementations, animals ingesting the SFM may have a higher feed efficiency than animals ingesting non-digestible artificial forages. The increased feed efficiency may be a result of the partial or complete digestibility of the SFM in the digestive tract of the ruminant.

In implementations, animals ingesting the SFM may have a higher feed efficiency than animals ingesting natural forage or fiber sources. The increased feed efficiency may be a result of the partial or complete digestibility of the SFM in the digestive tract of the ruminant.

Animals ingesting the SFM may experience improved performance or may maintain a desired level of performance compared to animals ingesting natural fiber. Ruminants ingesting the SFM may experience improved performance or may maintain a desired level of performance compared to ruminants ingesting natural forage. When provided to lactating ruminants, such as dairy cows, the SFM may beneficially assist in the transition period and support metabolic balance. When provided to beef cows, the SFM beneficially serves as a forage replacement or extender and also helps manage feedlot nutrition due to specific and predictable degradation of the SFM.

While the products and methods of the present disclosure are often described in relation to ruminants raised for dairy or meat production and feeding these ruminants the SFM, the SFM may be produced for other animals and be fed similarly to result in cost savings or improved performance. Some non-exhaustive examples of other ruminants and monogastric animals include horses, sheep, goats, oxen, musk ox, llamas, alpacas, guanicos, deer, bison, antelopes, camels, zebras, and giraffes.

Implementations of the present disclosure are more particularly described in the following examples that are for illustrative purposes only. Numerous modifications and variations are within the scope of the present disclosure as will be apparent to those skilled in the art.

EXAMPLES

Abbreviations

AF—As fed
Ctl—Control
DM—dry matter
Phos Acid—Phosphoric acid
RF—rumen fluid
TRT—treatment Example 1—Starch-Based Plastic as a Substitute Fiber Material (SFM)

1.1—Materials and Methods

Starch-based fiber materials were prepared using the components of Table 1.

TABLE 1

Components and Observations of Starch-Based Fiber Materials

Ingredient (wt % except Treatment A, vol %)

| TRT | Cold Water | Corn Starch | Glycerin | Vinegar | Other | Color |
|-----|------------|-------------|----------|---------|-------|-------|
| A | 70.5 | 17.6 | 5.9 | 5.9 | N/A | Clear |
| B | 75.3 | 10.5 | 7.0 | 7.2 | N/A | Pink |
| C | 78.0 | 10.9 | 3.6 | 7.5 | N/A | Clear |
| D | 78.1 | 10.9 | 7.2 | 3.8 | N/A | Green |

TABLE 1-continued

Components and Observations of Starch-Based Fiber Materials

Ingredient (wt % except Treatment A, vol %)

| TRT | Cold Water | Corn Starch | Glycerin | Vinegar | Other | Color |
|---|---|---|---|---|---|---|
| E | 62.4 | 11.0 | 7.0 | 4.0 | Urea - 15.6 | Blue |
| F | 78.0 | 10.0 | 7.0 | 4.0 | Xanthan Gum - 1.0 | Yellow |
| G | 60.0 | 11.0 | 7.0 | 7.0 | Urea - 15.0 | Blue |
| H | 74.0 | 10.0 | 7.0 | 7.0 | Formula Feed - 2.0 | Purple |
| I | 68.1 | 13.3 | 9.3 | 9.3 | N/A | Orange |
| J | 68.1 | 13.3 | 9.3 | 9.3 | N/A | Red |

Treatments A to D and F to I of Table 1 were prepared in 100 g batches by weighing each component into a beaker and then heating the blended liquid on a hot plate with continuous agitation to maintain the starch in suspension. The material was heated until it began to thicken (about 145° F.), and heating was maintained until the material was very thick and had a paste-like consistency (about 165° F. to 180° F.). Then it was poured onto a stainless steel sheet coated with mineral oil as a release agent. The material was turned over after 24 hours to promote continued drying on the underside of the material.

Treatment E was prepared according to the method for Treatments A to D and F to I except that urea was dissolved in the water prior to adding the other components.

Treatment J of Table 1 was prepared in 10 lb. batches by combining the components in a blender and mixing them for 1 minute to ensure that the starch was completely dispersed in the water. The material was then transferred to a steam kettle where it was heated until thick. Then it was poured onto a cookie sheet and placed on a rack in a hot room at 115° F. to promote drying faster than at room temperature. After several hours, when the top of the material had started to skin over, the material was removed from the cookie sheet and turned over on the wire rack to promote continued drying. After the material had dried for two days, it was cut into strips using a paper cutter and scissors.

1.2—Observations and Results

Treatment A lost a considerable amount of mass due to dehydration. It dried clear and very flexible. Treatment C, which comprised a reduced amount of glycerin compared to the other treatments, yielded a more rigid, slightly brittle product. The material of Treatment E was too soft and did not heat to a high enough temperature during processing. The material of Treatment F did not mix or heat well and did not form a solid. The material of Treatment H lost a considerable amount of mass during drying despite the inclusion of a humectant. The material of Treatment J appeared sensitive to the final heating temperature or heating time. The top surfaces of some batches of Treatment J remained smooth while drying but the top surfaces of other batches cracked.

The results demonstrate that a starch-based fiber material was successfully produced with varying amounts of water, corn starch, glycerin, and vinegar.

Example 2—Fiber Materials Comprising Grain and Acid Combinations

Several grain sources, types of acids, and particle sizes of corn flour were evaluated in Example 2.

2.1—Materials and Methods

Starch-based fiber materials were prepared using the components of Table 2.

TABLE 2

Components of Starch-Based Fiber Materials

Ingredient (wt %)

| TRT | Water | Glycerin | Corn | ACM Corn | Oat | Wheat | Barley | Vinegar | Citric acid | Phos acid |
|---|---|---|---|---|---|---|---|---|---|---|
| 1 | 67.7 | 9.5 | 13.3 | | | | | 9.5 | | |
| 2 | 75.7 | 9.5 | 13.3 | | | | | | 1.5 | |
| 3 | 75.2 | 9.5 | 13.3 | | | | | | | 2 |
| 4 | 67.7 | 9.5 | | 13.3 | | | | 9.5 | | |
| 5 | 75.7 | 9.5 | | 13.3 | | | | | 1.5 | |
| 6 | 75.2 | 9.5 | | 13.3 | | | | | | 2 |
| 7 | 67.7 | 9.5 | | | 13.3 | | | 9.5 | | |
| 8 | 75.7 | 9.5 | | | 13.3 | | | | 1.5 | |
| 9 | 75.2 | 9.5 | | | 13.3 | | | | | 2 |
| 10 | 67.7 | 9.5 | | | | 13.3 | | 9.5 | | |
| 11 | 75.7 | 9.5 | | | | 13.3 | | | 1.5 | |
| 12 | 75.2 | 9.5 | | | | 13.3 | | | | 2 |
| 13 | 75.7 | 9.5 | | | | | 13.3 | | 1.5 | |

The average particle size of the ACM (Air Classifying Mill) ground corn was smaller than that of the corn flour. For the ACM ground corn, 6% passed the 400 mesh screen of an Alpine sifter and 42% passed a 200 mesh screen. For the corn flour, 6% passed a 400 mesh screen and 27% passed a 200 mesh screen.

The treatments of Table 2 were prepared by weighing the water, acid, and glycerin into a beaker and then heating the liquid on a hot plate with magnetic stirring for several minutes. The flour was weighed and added slowly to the stirred liquid to minimize or prevent clumping. When the material reached 150° F., mechanical stirring was ceased and manually stirring with a spatula was commenced until the material reached 180° F. The material was then extruded on an ultra-high molecular weight plastic tray using a syringe to deposit ¼-in diameter strips spaced about ¼ in apart. The product was dried in a hot room at a temperature of 120° F. for 24 hours. The dried strips were cut into 3-in lengths.

2.2—Observations and Results

Treatments 7, 8, and 9, which each comprised wheat flour, yielded products that were much thicker than the products of other treatments and had very firm gel consistencies.

Treatments 3, 6, 9, and 12, which each comprised phosphoric acid, yielded products that were thinner than those of the corresponding treatments that included the same grain source but a different acid. For example, Sample 3, which comprised corn and phosphoric acid, yielded a product that spread to twice its original width and dried as a thin sheet. Samples 1, 2, and 13, which each comprised corn and an acid other than phosphoric acid, produced products with round spaghetti-like shapes.

Treatment 13, which comprised ACM corn with a small particle size, had a similar consistency as Treatment 2, which comprised corn flour with a larger particle size.

Example 3—In Vitro Fermentation of Starch-Based Fiber Material

Treatments A to D of Example 1 and alfalfa stems as a control were studied in an in vitro fermentation assay.

3.1—Materials and Methods

Van Soest and McDougall buffers for in vitro fermentation assays were prepared according to standard protocols known in the art. Barr buffer was prepared according to standard protocols except that the sodium carbonate was added at the end. Carbon dioxide was bubbled through each buffer to make it anaerobic.

Rumen fluid (RF) was prepared by collecting 50% liquid and 50% solids from the rumen of 4 animals that had been fed 50% concentrate, 50% forage on a dry matter basis. The RF was blended under carbon dioxide for 30 seconds, stained through 4 layers of cheese cloth, and then centrifuge at 100×g for 10 min to remove feed particles and protozoa. The supernatant was used as inoculum.

Fermentations were conducted in 50 ml plastic centrifuge tubes, each fitted with a #6 stopper and a fully depressed 60 ml catheter syringe to measure gas production. To each tube, 20 ml of buffer (Van Soest Buffer, McDougall Buffer, or Barr Buffer) prepared according to Table 3 was added. Then 10 ml of RF was added to each tube. Treatments A to D of Example 1 and a control treatment (alfalfa stems) (0.3 g or 0.5 g of each) were fermented. Gas production, as indicated by change in volume on the syringe, was measured every hour for 6, 10, or 24 hours, as indicated in Table 4. Tubes were opened and centrifuged for 10 min at 10,000×g. The supernatant was analyzed for volatile fatty acids (VFAs). The pellets were analyzed for dry matter digestibility, neutral detergent fiber (NDF) digestibility, and starch digestibility.

3.2—Results and Conclusions

For the date in Table 4, the moisture proportion was calculated by measuring the wet and dry weight of a given sample and dividing the difference by the wet sample weight. The proportion of dry matter (DM) was calculated by subtracting the moisture value from 1. The starting DM was calculated by multiplying the initial weight of a sample by the DM proportion. The remaining DM was determined by weighing the final dry sample. Proportion loss was then calculated by subtracting the ratio of remaining DM to starting DM from 1.

TABLE 4

| | | In Vitro Fermentation Results | | |
|---|---|---|---|---|
| Treatment | Time (h) | Starting DM (g) | Remaining DM (g) | Proportion Loss |
| A | 6 | 1.3827 | 0.8059 | 0.42 |
| B | 6 | 1.3384 | 0.7804 | 0.42 |
| C | 6 | 1.3759 | 0.9991 | 0.27 |
| D | 6 | 1.2978 | 0.7728 | 0.40 |

TABLE 4-continued

| | | In Vitro Fermentation Results | | |
|---|---|---|---|---|
| Treatment | Time (h) | Starting DM (g) | Remaining DM (g) | Proportion Loss |
| Control | 6 | 1.3888 | 1.1385 | 0.18 |
| A | 10 | 1.3713 | 0.6626 | 0.52 |
| B | 10 | 1.3367 | 0.6739 | 0.50 |
| C | 10 | 1.4424 | 0.9112 | 0.37 |
| D | 10 | 1.3615 | 0.6792 | 0.50 |
| Control | 10 | 0.4539 | 0.2281 | 0.50 |
| A | 24 | 1.4172 | 0.2622 | 0.81 |
| B | 24 | 1.3554 | 0.1662 | 0.88 |
| C | 24 | 1.4453 | 0.4680 | 0.68 |
| D | 24 | 1.3739 | 0.3801 | 0.72 |
| Control | 24 | 0.4539 | 0.2029 | 0.55 |

The results of Table 4 demonstrate that digestion loss increased over time, which indicates continued breakdown by fermentation over time. The results also indicate that treatments comprising lower amounts of glycerin (see Treatment C) or vinegar (see Treatment D) had lower DM losses at 24 hours.

At 10 hours, all SFM treatments were degraded to an extent equivalent to that of control (alfalfa stems). The results demonstrate that SFM ruminal degradability approximates alfalfa stem degradability. At 24 hours, all SFM treatments were degraded to an extent greater than that of control. The results demonstrate that the SFM is at least partially digestible in the rumen.

Example 4—In Vitro Digestion of Starch-Based Fiber Material

Treatments 1-13 of Example 2 were studied in an in vitro digestion assay to study the effects of starch and acid source on SFM breakdown in the rumen and the small intestines as well as on suitability as a foodstuff.

4.1—Materials and Methods

Samples (0.5 g) were added to fermentation tubes along with 30 mL of two parts anaerobic Van Soest buffer and one part prepared anaerobic rumen fluid. Each sample was fermented for the time indicated in Table 5 (6, 10, or 24 hours). After fermentation, for fermentation-only (F) samples, tube contents were poured through a 1 mm strainer and sample particles were collected and rinsed. The sample particles were dried at 55° C. For fermentation and alpha-amylase (F, A) samples, 0.1 g of alpha-amylase (Ankom Technologies, Macedon, N.Y.) was added and incubated for 2 h at 38.6° C. Samples were then strained, rinsed, and dried as described for the fermentation-only samples. Fermentation simulates digestion in the rumen and alpha-amylase treatment simulates digestion in the small intestines.

Treatment J of Example 1 was used as a control either with rumen fluid that had been strained through cheese cloth to remove feed particles (Treatment 14 in Table 5) or with rumen fluid that had been centrifuged to remove feed particles (Treatment 15 in Table 5).

4.2—Results and Conclusions

The data in Table 5 is an average of two replications for each condition.

TABLE 5

Digestibility Results

| Treatment | Condition | Time (h) 6 | Time (h) 10 | Time (h) 24 | Stan. Dev. at Time (h) 6 | Stan. Dev. at Time (h) 10 | Stan. Dev. at Time (h) 24 |
|---|---|---|---|---|---|---|---|
| 1 | F | 32.56 | 16.54 | 0.31 | 13.36 | 5.05 | 0.35 |
|  | F, A | 1.87 | 0.68 | 0.60 | 0.96 | 0.20 | 0.06 |
| 2 | F | 27.82 | 7.80 | 0.35 | 17.42 | 7.91 | 0.19 |
|  | F, A | 0.34 | 0.20 | 0.46 | 0.43 | 0.11 | 0.03 |
| 3 | F | 18.79 | 6.20 | 0.53 | 3.75 | 1.65 | 0.69 |
|  | F, A | 0.62 | 0.42 | 0.20 | 0.76 | 0 | 0.22 |
| 4 | F | 16.50 | 1.52 | 0.48 | 13.01 | 0.84 | 0.54 |
|  | F, A | 5.62 | 0.07 | 0.07 | 5.82 | 0.04 | 0.04 |
| 5 | F | 12.24 | 1.31 | 0.51 | 6.43 | 0.22 | 0.67 |
|  | F, A | 2.54 | 0.09 | 0.10 | 2.22 | 0.01 | 0.08 |
| 6 | F | 10.55 | 5.97 | 0.20 | 13.60 | 2.56 | 0.20 |
|  | F, A | 0.50 | 0.08 | 0.14 | 0.66 | 0.03 | 0.14 |
| 7 | F | 22.04 | 4.58 | 0.68 | 9.87 | 1.02 | 0.59 |
|  | F, A | 1.79 | 0.13 | 0.34 | 2.42 | 0.12 | 0.23 |
| 8 | F | 9.81 | 5.07 | 0.29 | 0.19 | 6.73 | 0.35 |
|  | F, A | 1.82 | 0.52 | 0.31 | 2.22 | 0.36 | 0.24 |
| 9 | F | 18.23 | 2.78 | 0.23 | 1.79 | 1.69 | 0.13 |
|  | F, A | 1.63 | 0.72 | 0.25 | 1.82 | 0.65 | 0.24 |
| 10 | F | 27.04 | 9.24 | 0.05 | 16.33 | 11.72 | 0.02 |
|  | F, A | 0.50 | 0.48 | 0.13 | 0.58 | 0.57 | 0.10 |
| 11 | F | 19.44 | 4.23 | 3.59 | 10.99 | 5.05 | 5.02 |
|  | F, A | 0.29 | 0.18 | 0.14 | 0.35 | 0.2 | 0.14 |
| 12 | F | 16.59 | 5.77 | 0.06 | 12.78 | 6.21 | 0 |
|  | F, A | 0.25 | 0.37 | 0.12 | 0.21 | 0.41 | 0.11 |
| 13 | F | 33.13 | 13.84 | 0.34 | 10.13 | 8.54 | 0.42 |
|  | F, A | 0.77 | 0.64 | 0.19 | 1.01 | 0.57 | 0.21 |
| 14 | F | 50.03 | 42.05 | 33.14 | 4.75 | 10.44 | 8.41 |
|  | F, A | 12.92 | 11.07 | 3.83 | 5.87 | 2.85 | 1.43 |
| 15 | F | 56.67 | 51.86 | 31.62 | 1.28 | 0.37 | 1.75 |
|  | F, A | 21.50 | 14.72 | 1.65 | 5.44 | 5.70 | 0.75 |

The data of Table 5 demonstrate that SFM comprising a starch source other than corn starch was almost completely degraded in ruminal in vitro fermentation assays after 24 hours. SFM comprising a starch source other than corn starch was also almost completely degraded when a 24-hour fermentation was followed by amylase treatment.

SFM comprising an acid source other than acetic acid was almost completely degraded in ruminal in vitro fermentation assays after 24 hours. SFM comprising an acid source other than acetic acid was also almost completely degraded when a 24-hour fermentation was followed by amylase treatment.

Approximately 68% of SFM comprising corn starch and acetic acid (controls; Treatments 14 and 15) was digested by ruminal fermentation after 24 hours. When fermentation was followed by amylase treatment, approximately 97% of the SFM was digested.

Approximately 11% of Bio-Res pellets were digested by ruminal fermentation after 24 hours. When fermentation was followed by amylase treatment, approximately 13% of the Bio-Res pellets were digested.

The results of Table 5 demonstrate that SFM comprising a starch source other than corn starch and an acid source other than acetic acid are digested faster than SFM comprising corn starch and acetic acid in ruminal in vitro fermentation assays followed or not by alpha-amylase treatment.

Example 5—In Vitro Digestion of Starch-Based Fiber Material

Treatment D of Example 1 was tested in an in vitro digestion assay to study SFM breakdown in the rumen, the abomasum, and the small intestines.

5.1—Materials and Methods

Samples of Treatment D of Example 1 were cut into ⅛ inch (0.3 cm)-strips. The strips were subject to the following conditions as shown in Table 6: 24-hour in vitro fermentation (F) according to the procedure of Example 3; 24-hour in vitro fermentation according to the procedure of Example 3 immediately followed by alpha-amylase treatment (which comprised incubating a sample in 75 ml Van Soest buffer and 75 μl of alpha-amylase (Ankom Technologies, Macedon, N.Y.)) for 1 h (F, A); 24-hour in vitro fermentation according to the procedure of Example 3 immediately followed by acid pepsin treatment (which comprised incubating a sample in 150 ml of a 0.1 N HCl solution with 2 g/L pepsin) for 2 h and then alpha-amylase treatment for 1 h (F, P, A). Fermentation simulates digestion in the rumen, acid pepsin treatment simulates digestion in the abomasum, and alpha-amylase treatment simulates digestion in the small intestines.

5.2—Results and Conclusions

The data in Table 6 is an average of three replications for each condition.

TABLE 6

Digestibility Results

| Condition | Start DM (g) | End DM (g) | Degraded (%) |
|---|---|---|---|
| F | 1.40 | 0.27 | 80.5 |
| F, A | 1.40 | 0.035 | 97.5 |
| F, P, A | 1.38 | 0 | 100 |

The data of Table 6 demonstrate that approximately 81% of the SFM was digested by ruminal fermentation after 24 hours. When fermentation was followed by amylase treatment, approximately 98% of the SFM was digested. When fermentation was followed by both acid pepsin and alpha-amylase treatments, 100% of the SFM was digested.

The results demonstrate that SFM was digestible in the rumen as well as in the abomasum and small intestines. SFM was completely digested in in vitro studies simulating ruminant total tract digestibility.

Example 6—in Sacco Digestion of Starch-Based Fiber Material

Particle size is known to impact the digestibility of animal feeds, which in turn influences feed production and packaging. Several lengths of SFM were tested in an in sacco digestion assay to study the impact of SFM length on digestibility.

6.1—Material and Methods

Two rumen cannulated steers were fed a ration according to Table 7 for at least 7 days before experiments began. DC999 Base is a feed concentrate with vitamins and minerals. DC999 Hi-Supp is a protein supplement.

TABLE 7

Ration Formulation

| Component | AF (lb.) | DM (lb.) |
|---|---|---|
| Corn Silage | 18.04 | 7.12 |
| Alfalfa Hay | 3.23 | 2.76 |
| Wheat Straw | 0.70 | 0.60 |
| Whole Cottonseed | 0.78 | 0.69 |
| Propel Energy Plus (Purina Animal Nutrition, Shoreview, MN) | 0.79 | 0.78 |

TABLE 7-continued

Ration Formulation

| Component | AF (lb.) | DM (lb.) |
|---|---|---|
| DC999 Base 11-2014 | 4.01 | 3.57 |
| Corn, dry ground | 1.38 | 1.21 |
| DC999 Hi-Supp 10-2013 | 3.07 | 2.76 |
| Total | 32.00 | 19.49 |

A starch-based fiber material was prepared according to Table 8. The components were blended in a 30-gallon stainless steel tank. Use of cold liquid helped to minimize clumping upon addition of the starch and continuous agitation helped to prevent the starch from settling to the bottom of the tank. The liquid was pumped to a Readco continuous mixer using a piston pump. A soy oil dripping system supplied oil to the formula prior to heating.

The mixer was run at 45 rpm with 310° F. steam supplied to the mixer jacket, which was equipped with a condensate trap on the outlet. The exit gate of the mixer was closed to a ⅛-in opening, which allowed the material to exit the mixer at 175° F. to 180° F. The material was clear, which indicated that the ingredients had been adequately heated and reacted. The material was dropped into a Moyno pump with an auger feeding the material into a rotor and stator to promote pumping.

The material exited the pump via a T-pipe feeding two ⅜-inch pipe that each dropped material onto a drying belt. The drying belt was run at 5.5 ft/min. A heater plus fan produced an exit air temperature of 118° F. The ambient air temperature was about 70° F. The material was removed from the end of the drying belt, placed on metal sheets, and dried a hot room for several hours. Then the material was removed from the sheets and placed directly on a wire drying rack, which promoted better air circulation and more exposed surface area in order to increase the drying rate.

TABLE 8

Components of Starch-Based Fiber Material

| Ingredient | Wt % |
|---|---|
| Glycerin | 18.14 |
| Citric acid anhydrous | 1.43 |
| Corn starch | 25.43 |
| Water | 55.00 |

Samples of the SFM formulation of Table 8 were cut into 0.4 cm, 6 cm, or 12 cm strips and were weighed (5 g) into dry in situ forage bags (Ankom R1020, 10 cm×20 cm; Ankom Technologies, Macedon, N.Y.; 100° C. for 24 h). The bags were then heat sealed and weighed. Bags were placed in sacco for 0 h, 6 h, 10 h, 18 h, 24 h, or 48 h. Each of the strip lengths was provided to each of the 2 steers for study at each of the 6 time points. After the study period, bags were removed from the rumen, rinsed in cold water until the water ran clear, and then dried at 100° C. for 24 h. The bags, including their contents, were then weighed to determine dry matter digestion.

6.2—Results and Conclusions

Results of the in sacco digestion assay are presented in FIG. 1. The results demonstrate that SFM is digested in the rumen. Approximately 39% of each length of SFM was digested within 6 h and approximately 43% of each length of SFM was digested within 10 h. At least 49% was digested within 18 h, at least 51% within 24 h, and at least 65% within 48 h. The 12-cm pieces were digested to a slightly lesser extent than the 0.4-cm pieces at the 18-, 24-, and 48-h time points, and the 6 cm pieces were digested to a slightly lesser extent than the 12-cm pieces at the 18-, 24-, and 48-h time points.

The results of FIG. 1 also demonstrate that the rate of digestion changed over time. The rate was highest within the first 6 h and then slowed down. The digestion pattern of FIG. 1 is slower than known starch breakdown patterns, but faster than expected forage patterns.

Example 7—Consumption of SFM

Feed component particle size is known to impact sorting and selecting of feed ration components by animals. Several lengths of SFM were tested in vivo to study the impact of SFM length on feeding behavior (sorting).

7.1—Materials and Methods

Steers were fed total mixed ration (TMR) diets (34 lbs.) consisting of 25% corn silage, 25% alfalfa hay, and 50% DC999 on an as-is basis.

Two Holstein steers were fasted for 1 h before being offered 1300 g (2.8 lb.) of TMR mixed with 1300 g of SFM prepared according to Table 8 in either 2.5- or 5-inch lengths. After 1 h, the uneaten SFM was weighed and divided evenly into the 4 remaining feedings for the day. The SFM remaining after 24 h was weighed.

7.2—Results and Conclusions

TABLE 9

SFM Consumption

| Steer | SFM Length (in) | Amount Fed (g AF) | Amount Remaining After 1 h (g AF) | Amount Remaining After 24 h (g AF) |
|---|---|---|---|---|
| A | 2.5 | 1300 | 120 | 0 |
| B | 2.5 | 1300 | 6 | 0 |
| A | 5 | 1300 | 0 | 0 |
| B | 5 | 1300 | 0 | 0 |

The results of Table 9 demonstrate that all or almost all of the SFM was consumed within 1 hour regardless of product length and all of the SFM was consumed within 24 hours. The results also indicate that steers were not sorting against SFM and consumed it when it was offered.

SFM may be a feed ingredient even in rations or situations in which sorting is a challenge.

Example 8—Composting of Starch-Based Fiber Material

Results of Example 5 demonstrate that SFM is completely broken down in an in vitro model of digestion in the rumen, abomasum, and small intestines. The compostability of SFM was studied to investigate the fate of SFM that passes through the digestive tract in vivo.

8.1—Materials and Methods

SFM was produced using the components of Table 10.

TABLE 10

Components of SFM Used in Composting Study

| Ingredient | TRT (wt %) |
|---|---|
| Water | 68.3 |
| Vinegar (8% acetic acid) | 9.2 |
| Citric Acid | |
| Glycerin | 9.2 |
| Corn Starch | 13.2 |

Ten kg of active compost was collected from the Purina Composting Center. At least 2 kg of particles that passed through a 3-mm sieve screen were collected, to which 10% ground (3 mm) alfalfa hay and 10% water, to a final moisture content of 40-60%, were added to produce Starting Compost. Trials were conducted in 12 oz. (375 ml) plastic containers with 75 3-mm aeration holes drilled into the bottom, sides, and lid. SFM and alfalfa stems were cut to 15 mm. Starting Compost (100 g) and 10 g of either SFM or alfalfa stems (as a control) were added to each container and covered with a lid. SFM was tested in triplicate at each time point; a single container of alfalfa stems was tested at each time point.

The starting weight of each container was 140 g. Moisture content was maintained at 40-60% by adding water as necessary up to the starting weight. At the end of each of 2 weeks, 4 weeks, 6 weeks, 8 weeks, and 10 weeks, the contents of the containers were sieved through a 3-mm screen to collect any remaining SFM or alfalfa stems. The collected SFM or alfalfa stems were dried and weighed to calculated % degraded.

8.2—Results and Conclusions

Figure 2:
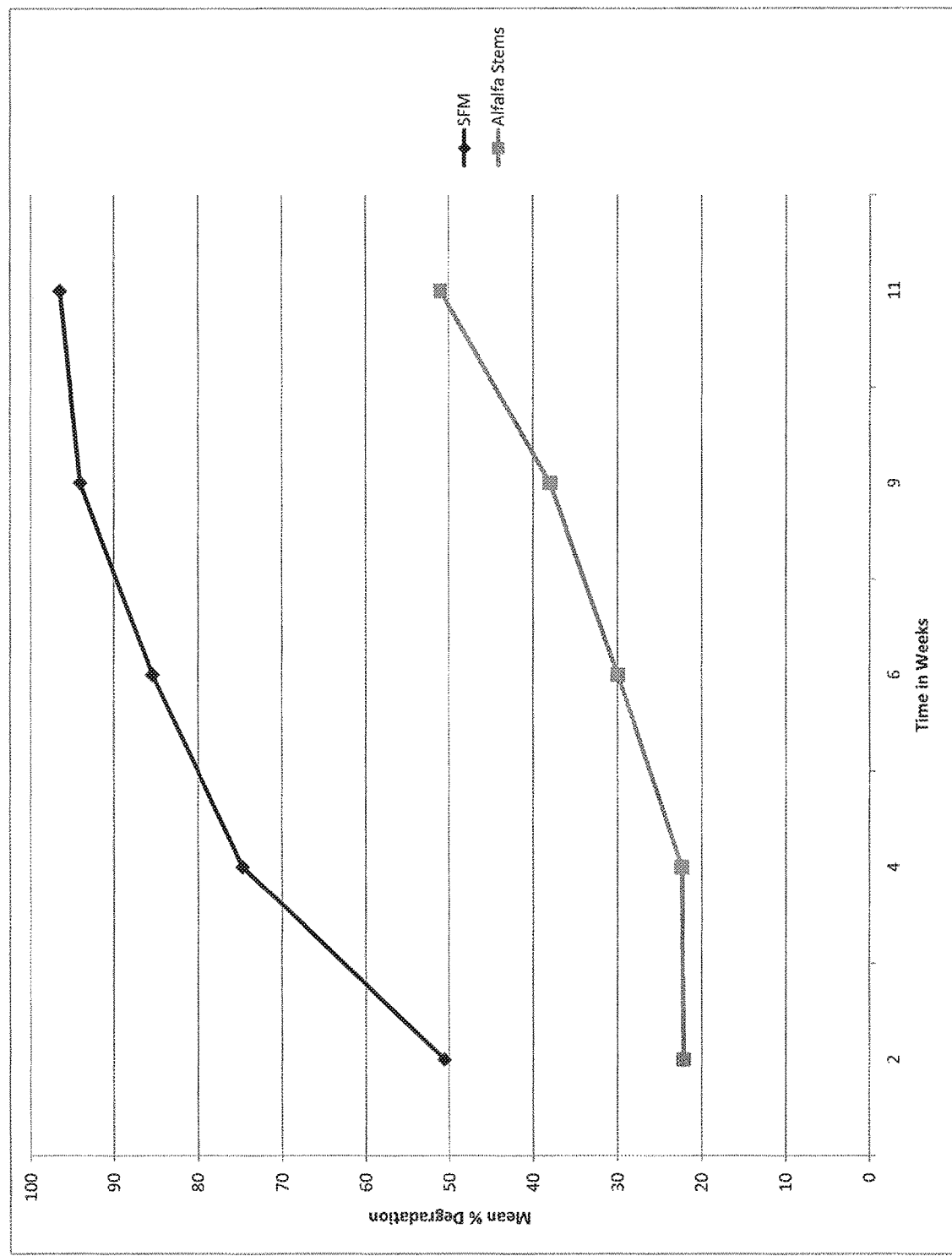
FIG. 2 is a graph illustrating the amount of SFM or alfalfa stems remaining after composting for up to 11 weeks.

Results of the composting study are presented in Table 11 and FIG. 2.

TABLE 11

Composting of SFM

| | Mean % Degradation | |
|---|---|---|
| Week | SFM | Alfalfa Stems |
| 2 | 50.60 | 22.2 |
| 4 | 74.67 | 22.4 |
| 6 | 85.40 | 30.0 |
| 9 | 94.07 | 38.0 |
| 11 | 96.47 | 51.0 |

The results demonstrate the SFM was degraded to a greater extent than control (alfalfa stems) at each tested time point. SFM was 50% degraded after 2 weeks; alfalfa stems were 22% degraded after 2 weeks. Alfalfa stems were not 50% degraded until after 11 weeks. SFM was almost completely (94%) degraded after 9 weeks. The rate of degradation over the first 4 weeks was faster for SFM than for control.

The results of Table 11 and FIG. 2 demonstrate that if SFM were to be passed through an animal into the manure, it would be degradable at least by composting.

While the present disclosure provides various ranges, it will be understood that values, such as numeric integer values, at or within these ranges, or various ranges within the disclosed ranges, or ranges beginning or ending at a range value and beginning or ending at a value within the disclosed ranges may be used in particular embodiments without departing from the invention.

The various embodiments described above are provided by way of illustration only and should not be construed to limit the claims attached hereto. It will be recognized that various modifications and changes may be made without following the example embodiments and applications illustrated and described herein, and without departing from the true spirit and scope of the claims.

What is claimed is:

1. A method of feeding a ruminant, the method comprising:
    feeding the ruminant a substitute fiber material, the substitute fiber material comprising at least one starch, at least one cross-linker, and at least one plasticizer,
    wherein the starch is heated in the presence of the cross-linker to cross-link the starch, and then the substitute fiber material is dried to form a cross-linked bioplastic,
    wherein the substitute fiber material is at least partially digested by the ruminant,
    wherein the starch is present at about 2 wt % to about 25 wt % based on a total weight of the substitute fiber material before being dried, and the starch is provided as particles having a particle size such that about 20% to 55% of the particles pass through a 200 mesh screen,
    wherein the at least one cross-linker is present at about 0.2 wt % to about 16 wt % based on a total weight of the substitute fiber material before being dried, and
    wherein the at least one plasticizer is present at about 1 wt % to 24 wt % based on a total weight of the substitute fiber material before being dried.

2. The method of claim 1, wherein the substitute fiber material comprises at least one starch in an amount of about 25 wt % to about 70 wt % by dry weight of the substitute fiber material.

3. The method of claim 1, wherein the at least one starch is a whole grain.

4. The method of claim 3, wherein the whole grain comprises one or more of corn, wheat, oat, or barley.

5. The method of claim 3, wherein the whole grain in the substitute fiber material has a particle size such that about 3% to 10% of the particles pass through a 400 mesh screen.

6. The method of claim 1, wherein the at least one cross-linker is an edible acid and comprises one or more of acetic acid, citric acid, fumaric acid, lactic acid, malic acid, phosphoric acid or tartaric acid.

7. The method of claim 6, wherein the edible acid is citric acid.

8. The method of claim 1, wherein the plasticizer comprises one or more of arabitol, erythritol, glycerin, isomalt, lactitol, maltitol, mannitol, sorbitol or xylitol.

9. The method of claim 8, wherein the plasticizer is glycerin.

10. The method of claim 1, wherein the substitute fiber material is biodegradable.

11. The method of claim 1, wherein the substitute fiber material is at least partially degraded in each of the rumen, the abomasum, and the small intestines.

12. The method of claim 1, wherein the substitute fiber material is at least partially degraded in the rumen.

13. The method of claim 1, wherein the substitute fiber material has a total tract digestibility of about 100 percent.

14. The method of claim 1, wherein the substitute fiber material comprises strips of about 0.2 cm to 20 cm in length.

15. The method of claim 1, wherein the starch is heated to at least 145° F. in the presence of the cross-linker to cross-link the starch.

16. The method of claim 1, wherein the starch is present at about 10 wt % to about 25 wt % based on a total weight of the substitute fiber material before being dried.

17. The method of claim 1, wherein the at least one cross-linker is present at about 1 wt % to about 10 wt % based on a total weight of the substitute fiber material before being dried.

18. The method of claim 1, wherein the at least one plasticizer is present at about 2 wt % to 20 wt % based on a total weight of the substitute fiber material before being dried.

* * * * *